Patented Apr. 14, 1942

2,279,901

UNITED STATES PATENT OFFICE 2,279,901

FORMATION OF PLASTIC SHEETS

Dario Domizi, Parma, Ohio, assignor to Carbide and Carbon Chemicals Corporation, a corporation of New York No Drawing. Application July 9, 1938, Serial No. 218,392

10 Claims. (Cl. 18—57)

This invention relates to the formation of flexible sheets from polyvinyl partial acetal resins, and it is particularly directed to the fabrication of clear and homogeneous sheets, such as are employed as interlayers in laminated non-shattering glass, from water-insoluble plasticized polyvinyl partial acetal resin compositions which exhibit a nautral adhesion to smooth surfaces.

Polyvinyl partial acetal resins may be prepared, for example, by the incomplete condensation of aldehydes with polyvinyl alcohol (obtainable by the saponification or hydrolysis of polyvinyl esters), and they contain, attached to the polymeric nucleus, both acetal groups and unreacted hydroxyl groups, and substantially no others. The degree to which the hydroxyl groups of the polyvinyl macromolecule have been combined with aldehyde may be indicated directly, and will be referred to herein as percent acetalization. Various methods have been proposed for making polyvinyl partial acetal resins, and the mode by which they originate is not essential to this invention.

In the case of the polyvinyl partial acetal resins and plasticized compositions containing them which are strongly adhesive, it has been extremely difficult to fabricate sheets having surfaces free from defects, and of accurate and uniform thickness, in addition to the primary requisite that the plasticized composition itself be homogeneous and of uniform density throughout. In combining the resin and plasticizer, the production of a perfectly uniform composition has required very long periods of mixing, even with the aid of heat, pressure and volatile solvents or non-solvents for the resin, due to the difficulty to achieve a perfectly even distribution of the plasticizer throughout the resin. Without this even distribution, the sheet has weak spots and shows marked optical distortion when used in laminated glass. When the resin has become sufficiently plasticized and is ready for rolling into sheets, its adhesive quality causes it often to stick to the rolls, or at least the sheet so formed has rough surface streaks and is of decidedly uneven thickness, or caliper. In addition, such sheets are extremely hard to handle. This is particularly true in such operations as assembling the sheets with glass for laminating because they stick to the glass so tenaciously wherever there is contact, that it is almost impossible to align the resin and glass, or to smooth out any ripples or air bubbles which might be between the layers.

By the process of this invention the resin and plasticizer may be combined into a perfectly transparent, homogeneous composition in a relatively short time and with a minimum of trouble. The composition may be rolled into smooth sheets of uniform caliper and these sheets may be handled conveniently without sticking to smooth surfaces with which they come in contact, although the resin regains fully its adhesive properties under moderate heat and pressure, such as are commonly employed in the fabrication of laminated glass structures.

In order to obtain plasticized polyvinyl partial acetal resins having great strength and extensibility, it is necessary that the resin be derived from a polyvinyl body of high molecular weight, such as polyvinyl alcohol or an ester thereof having a molecular weight in excess of about 10,000, and resins prepared from polyvinyl acetate having an average molecular weight of at least 25,000 are preferred. (Molecular weights referred to herein are calculated by means of Staudinger's formula from viscosity determinations on solutions of the materials.) The resin also must be insoluble in the plasticizer at ordinary temperatures, but at the same time capable of absorbing sufficient quantities of the plasticizer to render the resulting composition sufficiently pliable. In general, polyvinyl partial acetal resins acetalized between about 33% and 94% with aliphatic aldehydes having from 2 to 6 carbon atoms are capable of forming plasticized compositions of great strength and toughness when combined with suitable plasticizers. The most desirable resins are those which are acetalized between about 88% and about 94% with acetaldehyde; between about 52% and about 92% in the case of propionaldehyde; between about 42% and about 82% with butyraldehyde; between about 33% and about 62% with valeraldehyde; and about 33% and about 45% with hexaldehyde. Of this group, especially valuable resins are those acetalized between 54% and 78% with butyraldehyde, between 62% and 88% with propionaldehyde, and between 39% and 58% with valeraldehyde, in the order named.

These resins are, in general, insoluble at ordinary temperatures (below 40° C.) in water-insoluble liquids, such as aliphatic and aromatic hydrocarbons, ethylene dichloride, chloroform, methylene chloride, ethyl acetate, etc., with the exception that portions of the more highly acetalized resins described may dissolve in certain chlorinated hydrocarbons. It is believed that this partial solubility of the more highly acetalized resins may be due to the fact that every polyvinyl

or is rotated at the lower peripheral speed in order to have the bank of resin rolling in the same direction as the top roll. Preferably, the bank should rotate at a peripheral speed somewhat less than that of either roll.

Of the many corrosion-resistant metals which can be used to surface the calender rolls, nickel, and chromium are unusually well suited for this purpose, and the optimum results are obtained when one nickel surfaced roll and one chromium surfaced roll are used, the latter being slightly smoother than the former so that the bank of resin will rotate in the same direction as the chromium surfaced roll.

The matte surfaces of the rolls may be prepared by any of the well known methods for roughening metallic surfaces, but from the practical standpoint, a uniform finish is more easily obtained and maintained if the desired finish is prepared on the cast roll and the metal desired for the finished surface plated directly thereon, without further roughening.

Although the best results are obtained only when both rolls have a matte finish, a sheet of fairly uniform caliper can be made with one roll having a matte surface and the other roll highly polished. Of course, this combination produces a sheet which is extremely "tacky" or adhesive on the side which was in contact with the polished roll, and it must be handled so that this side does not inadvertently come in contact with other smooth surfaces.

The optimum temperature of the calender rolls depends upon the temperature and the moisture content of the resin being passed through the calender. It is highly desirable that the resin fed to the calender be hotter than the calender rolls themselves in order to produce sheets of the most uniform physical characteristics. If the resin is colder than the rolls, the calendered sheet may show rough streaks, a general roughening, or "pinched spots," and non-uniform caliper. With resin at 85° to 100° C., roughened chromium or nickel surfaced rolls should be operated at about 60° to 75° C., while cast iron rolls, similarly roughened, operate best at 55° to 65° C.

The resin sheet emerging from the calender contains a greater amount of moisture than is desirable for the fabrication of laminated glass. This moisture may largely be removed in any type of air drier wherein the air circulation is sufficiently high to dry the sheet in a fairly short time without excessive temperatures. Preferably, the sheet should be dried to approximately 1% moisture in a forced air drier of the conveyor type. Six to eight minutes at 60° to 90° C. is sufficient for most operations.

The process of this invention is applicable to the fabrication of sheets from the polyvinyl partial acetal resins described when combined with any plasticizer which is, of course, compatible therewith in the amounts employed. However, the advantages of the process are fully realized only when the plasticizer, which is incorporated in the resin, is one which does not adversely affect the latter's natural adhesive qualities. For the production of resilient sheets having great strength, it is necessary to employ plasticizers in which the resin will not dissolve at ordinary temperatures but which the resin will absorb in large quantities, and one of the most satisfactory resin and plasticizer combinations of this type has been found to be a polyvinyl partial acetal resin containing between 54% and 78% butyraldehyde, colloided with a triethylene glycol dihexoate (such as the 2-ethyl butyric acid ester), the plasticized composition containing between 25% and 45% by weight plasticizer, preferably about 30% by weight. It is in the calendering of such resin compositions that the advantages of this invention are most apparent.

The usefulness of the new articles is not confined to laminated non-shattering glass, but they may be employed generally where tough and resilient sheets are required.

Other modifications will be apparent and such modifications are included within the invention as defined by the appended claims.

I claim:

1. In the process of calendering into sheets suitable as interlayers for laminated glass heated masses of a plastic composition essentially composed of a water-insoluble polyvinyl partial acetal resin in combination with a plasticizer, the steps of introducing an unsheeted mass of said plastic composition in the bight of a pair of heated rollers, at least one of which has a frosted or matte finish, and rotating said rollers to form a sheet of uniform thickness from said mass of plastic composition.

2. In the process of calendering into sheets suitable as interlayers for laminated glass heated masses of a plastic composition essentially composed of a water-insoluble polyvinyl partial acetal resin in combination with a plasticizer, the steps of introducing an unsheeted mass of said plastic composition in the bight of a pair of heated rollers, both of said rollers having a matte or frosted finish, and rotating said rollers to form a sheet of uniform thickness from said mass of plastic composition.

3. In the process of calendering into sheets suitable as interlayers for laminated glass heated masses of a plastic composition essentially composed of a water-insoluble polyvinyl partial acetal resin acetalized between 33% and 94% with an aliphatic aldehyde having from two to six carbon atoms, in combination with a plasticizer, the steps of introducing an unsheeted mass of said plastic composition in the bight of a pair of heated rollers, at least one of which has a frosted or matte finish, and rotating said rollers to form a sheet of uniform thickness from said mass of plastic composition.

4. In the process of calendering into sheets suitable as interlayers for laminated glass heated masses of a plastic composition essentially composed of a polyvinyl partial acetal resin acetalized with an aldehyde of the group consisting of acetaldehyde from 88% to 94%, propionaldehyde from 52% to 92%, butyraldehyde from 42% to 82%, valeraldehyde, from 35% to 62%, and hexaldehyde from 33% to 45%, said resin being in combination with a plasticizer, the steps of introducing an unsheeted mass of said plastic composition in the bight of a pair of heated rollers, at least one of which has a frosted or matte finished metal surface of the group of chromium and nickel, and rotating said rollers to form a sheet of uniform thickness from said mass of plastic composition.

5. In the process of calendering into sheets suitable as interlayers for laminated glass heated masses of a plastic composition essentially composed of a water-insoluble polyvinyl partial acetal resin in combination with a plasticizer and a small quantity of water, the steps of introducing a heated unsheeted mass of said plastic composition in the bight of a pair of heated rollers maintained at a temperature below that of said mass, both of said rollers having a frosted or matte finish, and rotating said rollers to form a sheet of uniform thickness from said mass of plastic composition.

6. In the process of calendering into sheets suitable as interlayers for laminated glass heated masses of a plastic composition essentially composed of a water-insoluble polyvinyl partial acetal resin acetalized with an aldehyde of the group consisting of acetaldehyde from 88% to 94%, propionaldehyde from 52% to 92%, butyraldehyde from 42% to 82%, valeraldehyde from 35% to 62%, and hexaldehyde from 33% to 45%, said resin being in combination with a plasticizer and a small quantity of water, the steps of introducing an unsheeted mass of said plastic composition at a temperature between 90° C. and 110° C. in the bight of a pair of rollers maintained at a temperature between 60° C. and 75° C., both of said rollers having a frosted or matte finish, and rotating said rollers to form a sheet of uniform thickness from said mass of plastic composition.

7. In the process of calendering into sheets suitable as interlayers for laminated glass heated masses of a plastic composition essentially composed of a water-insoluble polyvinyl partial acetal resin in combination with a plasticizer, the steps of introducing an unsheeted mass of said composition in the bight of a pair of heated rollers, at least one of which has a frosted or matte finish, maintaining a revolving bank of said composition between said rollers, and rotating said rollers to form a sheet of uniform thickness from said bank of plastic composition.

8. An interlayer for laminated glass consisting of an inherently transparent plastic sheet of uniform thickness and free from surface flaws comprising a naturally adhesive homogeneous combination of a water-insoluble polyvinyl partial acetal resin and a plasticizer, said sheet having a fine and uniform matte or frosted finish on at least one surface thereof, whereby said plastic sheet may be placed in contact with, and aligned on, a smooth glass surface without premature adhesion of the sheet to the glass, and without rippling or entrapment of air bubbles.

9. An interlayer for laminated glass consisting of an inherently transparent plastic sheet of uniform thickness and free from surface flaws comprising a naturally adhesive homogeneous combination of a water-insoluble polyvinyl partial acetal resin and a plasticizer, said sheet having a fine and uniform matte or frosted finish on both surfaces thereof, whereby said plastic sheet may be placed in contact with, and aligned on, a smooth glass surface without premature adhesion of the sheet to the glass, and without rippling or entrapment of air bubbles.

10. An interlayer for laminated glass consisting of an inherently transparent plastic sheet of uniform thickness and free from surface flaws comprising a naturally adhesive composition essentially composed of a polyvinyl partial acetal resin acetalized with an aldehyde of the group consisting of acetaldehyde from 88% to 94%, propionaldehyde from 52% to 92%, butyraldehyde from 42% to 82%, valeraldehyde from 35% to 62% and hexaldehyde from 33% to 45%, said resin being in combination with a plasticizer, and said sheet having a fine and uniform matte or frosted finish on at least one surface thereof, whereby said plastic sheet may be placed in contact with, and aligned on, a smooth glass surface without premature adhesion of the sheet to the glass, and without rippling or entrapment of air bubbles.

DARIO DOMIZI.